(12) United States Patent
Novotny

(10) Patent No.: US 11,471,717 B1
(45) Date of Patent: Oct. 18, 2022

(54) EARLY FIRE DETECTION AND SUPPRESSION

(71) Applicant: Vlad Novotny, Los Gatos, CA (US)

(72) Inventor: Vlad Novotny, Los Gatos, CA (US)

(73) Assignee: Vlad Novotny, Los Gatos, CA (US)

( * ) Notice: Subject to any disclaimer, the term of this patent is extended or adjusted under 35 U.S.C. 154(b) by 212 days.

(21) Appl. No.: 16/729,139

(22) Filed: Dec. 27, 2019

Related U.S. Application Data

(60) Provisional application No. 62/786,926, filed on Dec. 31, 2018.

(51) Int. Cl.
*A62C 3/02* (2006.01)
*H04N 7/18* (2006.01)
*G01J 3/45* (2006.01)
*G06V 20/52* (2022.01)

(52) U.S. Cl.
CPC .......... *A62C 3/0271* (2013.01); *A62C 3/0242* (2013.01); *G01J 3/45* (2013.01); *G06V 20/52* (2022.01); *H04N 7/18* (2013.01)

(58) Field of Classification Search
CPC ......... A62C 3/0271; A62C 3/0242; G01J 3/45
See application file for complete search history.

(56) References Cited

U.S. PATENT DOCUMENTS

| | | | | |
|---|---|---|---|---|
| 4,728,061 A * | 3/1988 | Johnson | .................. | B64G 1/286 244/164 |
| 5,963,166 A * | 10/1999 | Kamel | .................... | B64G 1/361 342/357.31 |
| 6,567,645 B1 * | 5/2003 | Wiedeman | ......... | H04B 7/18534 455/430 |
| 9,464,934 B2 * | 10/2016 | Priore | ........................ | G01J 3/28 |
| 10,066,997 B2 * | 9/2018 | Korner | .................. | G01J 3/4338 |
| 10,306,155 B2 * | 5/2019 | Jhabvala | ............ | G02B 17/0808 |
| 10,653,904 B2 * | 5/2020 | Conboy | ........... | G06Q 10/06311 |
| 10,695,597 B2 * | 6/2020 | Conboy | ................... | B27N 1/00 |
| 10,814,150 B2 * | 10/2020 | Conboy | ................. | A62C 35/13 |
| 2002/0041328 A1 * | 4/2002 | LeCompte | ........... | G01C 11/025 348/144 |
| 2011/0261351 A1 * | 10/2011 | Treado | ...................... | G01J 3/02 356/73 |

(Continued)

OTHER PUBLICATIONS

B. T. Jou et al., "Architecture Options for Satellite Integration into 5G Networks," 2018 European Conference on Networks and Communications (EuCNC), 2018, pp. 398-399, doi: 10.1109/EuCNC.2018.8442436. (Year: 2018).*

(Continued)

*Primary Examiner* — Boubacar Abdou Tchoussou

(57) ABSTRACT

The system for very early detection and suppression of fires is comprised of the network of low orbiting micro-satellites, local drones, processing and communication equipment and fire suppression capabilities with fire retardants and water delivered by drones, helicopters, planes and/or ground fire crews. Micro-satellites and drones are equipped with very sensitive, high resolution imaging spectrometers operating in multiple visible and infrared wavelengths. Processors are used to analyze spectroscopic micro-satellite images to detect fires and to verify validity of fire detection by analysis of spectroscopic drone images. The system can prevent large wild fires anywhere in the world rapidly with high detection sensitivity and reliability.

14 Claims, 4 Drawing Sheets

(56) References Cited

U.S. PATENT DOCUMENTS

| | | | |
|---|---|---|---|
| 2013/0027701 A1* | 1/2013 | Priore | G01N 21/276 |
| | | | 356/326 |
| 2017/0059408 A1* | 3/2017 | Korner | G01B 11/2509 |
| 2017/0138789 A1* | 5/2017 | Ivanov | G02B 6/305 |
| 2017/0374297 A1* | 12/2017 | Jhabvala | H04N 5/33 |
| 2019/0168034 A1* | 6/2019 | Conboy | A62C 3/00 |
| 2019/0168036 A1* | 6/2019 | Conboy | A62C 3/0242 |
| 2020/0155881 A1* | 5/2020 | Tohidi | G06F 16/9038 |
| 2020/0155882 A1* | 5/2020 | Tohidi | G06N 7/005 |
| 2020/0159397 A1* | 5/2020 | Tohidi | G06F 3/04847 |
| 2020/0406075 A1* | 12/2020 | Conboy | G06Q 10/06311 |
| 2020/0408601 A1* | 12/2020 | Sasagawa | G08B 17/005 |
| 2021/0154502 A1* | 5/2021 | Conboy | A62C 3/02 |
| 2021/0319590 A1* | 10/2021 | Guide | G06T 7/97 |

OTHER PUBLICATIONS

Lapray, P.-J.; Wang, X.; Thomas, J.-B.; Gouton, P. Multispectral Filter Arrays: Recent Advances and Practical Implementation. Sensors 2014, 14, 21626-21659. https://doi.org/10.3390/s141121626 (Year: 2014).*

* cited by examiner

EARLY FIRE DETECTION AND SUPPRESSION

RELATED U.S. APPLICATION DATA

Provisional application No. 62 786 926 filed on Dec. 31, 2018.

BACKGROUND

Large, hard to control fires cause extensive devastation to property and infrastructure, huge financial losses and often injuries and lost lives.

Currently, there are local fire detection systems in place, but such systems are inadequate due to their inability to perform constant surveillance of large geographical areas as well as to provide spatial resolution that would detect fires at initial stages and not only when they have grown considerably in size. The existing systems are not suitable for early fire detection or suppression. Although few land-based, early forest fire detection systems can analyze the infrared and visible spectral signatures of a fire's plume and body, they cover a miniscule total area compared with the area of even a single state in the USA.

Currently, detecting fires is relatively primitive and slow which results in many fires growing to excessive size and spreading uncontrollably. Consequently, huge resources and spending are required to limit and stop them.

Spectroscopic satellites with adequate spatial resolution exist, however they are very complex and costly and there are only a few of them. Existing satellites with the ability to monitor real time and near real time (within 1 to 2 hours of occurrence) are simply not available to monitor large areas such as the entire continental USA or the whole world. In addition, spectroscopic capabilities must be optimized to reliably detect fires to ensure low levels of false positives and preferably no false negatives.

A large network of low orbiting, inexpensive spectroscopic imaging micro-satellites with specific fire detection capabilities in multiple spectral regions and frequent monitoring, an advanced image recognition system relying on Artificial Intelligence (AI) and fast communication networks connected to a validation system that uses drones equipped with additional spectroscopic imaging capabilities is proposed to monitor large areas in real time or near real time.

To reduce the impact of damaging fires, fires must be detected early so that they can be extinguished with limited resources when they are still manageable. A combination of micro-satellite detection with validation by small, local drones eliminates false positives from micro-satellite imaging and image recognition. Larger drones followed by helicopters or planes can attack fires early with fire retardants and water and can be the first line of defense to deal with small fires. With this type of monitoring and early fire mitigation, fires will not be able to grow to large, uncontrollable size. The common traditional response with firefighters and ground equipment can follow as necessary.

SUMMARY

Spectroscopic detection of fires anywhere in the world by a network of micro-satellites positioned at relatively low orbital altitudes with high spatial resolution, visible and infrared wavelength spectroscopic detection capabilities, coupled with drone detection for verification is followed by fire containment using planes, helicopters and/or fire crews.

These capabilities result in detecting and stopping fires at early stages so that fire suppression does not require extensive resources and effort. Consequently, fires can be extinguished at initial stages before they have chance to spread to a very large size.

DETAILED DESCRIPTION

This description relates to the architecture and implementation of an early and sensitive fire detection system which has real time or near real time response, high spatial resolution (<2 meters) and sensitivity, and low probability of false positives and optimally no false negatives.

Figure 1:
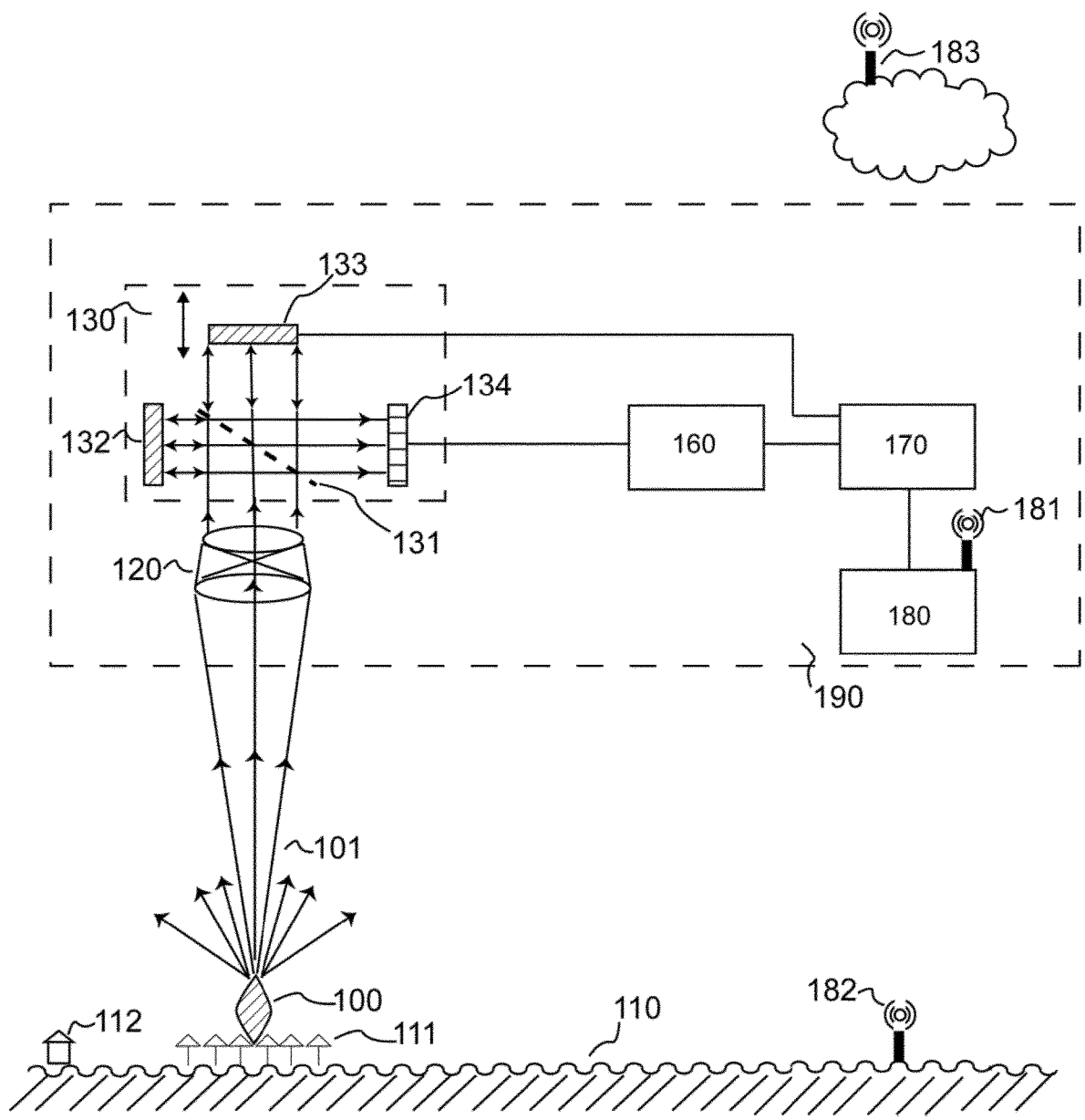
FIG. 1 is the schematic diagram of interferometer-based imaging spectrometer for detecting fire in a wide spectral range.

The key devices in detecting fires are arrays of imaging spectrometers, such as an interferometer-based imaging spectrometer shown in FIG. 1. Different fires such as biomass fires or residential and commercial structure fires have characteristic spectra that differentiate them from other light emissions and background illumination. Notably, fires generate light emissions depending on their temperature. This blackbody radiation is described by the equation:

$$I(\lambda,T)=2h\cdot\vartheta^3/[c^2(\exp(h\cdot\vartheta/k\cdot T)-1)], \quad (1)$$

where $I(\lambda, T)$ is energy emitted per unit surface area, per unit time, per unit solid angle and per unit wavelength emitted at a wavelength $\lambda$, h is Plank's constant, $\vartheta$ is the emitted frequency, c is the speed of light, k is Boltzman's constant and T is the temperature of the emission source. When $h\cdot\vartheta \gg k\cdot T$, equation (1) is simplified and the maximum emission intensity occurs at wavelength $\lambda_{max}=0.288/T$ [cm].

Fire temperature typically varies from about 1100 K to 1500 K. For fires with temperature T=1300 K, $\lambda$max=2.2 um in the Short Wave Infrared Region (SWIR) part of the spectrum. When the emission spectra are taken over a range of wavelengths or at least at selected wavelength regions, the dependence of the emitted light intensity on the wavelength according to equation (1) can be used to ascertain that the source of the detected light is a black body radiation emitter and not another light source such as incandescent lights at different temperatures, fluorescent lights, Light Emitting Diode (LED) or laser stimulated emission lights at night because these other light sources have very different spectroscopic signatures.

The schematic diagram in FIG. 1 represents a spectroscopic imaging micro-satellite system 190 for fire detection. Light 101 generated by fire 100 is emitted throughout its surroundings in all directions by burning vegetation 111, residential and commercial buildings 112, or other ground areas 110. Part of the emitted light can be captured by spectrometer 190. The key components of interferometer-based imaging spectrometer 190 are imaging optics 120, optical interferometer 130, spectral image capture and storage system 160, processor 170 and controller 180. Imaging optics 120 collects light from an area on the ground 110 and provides a spectroscopic image of that area. The spectrometers best suited for imaging spectroscopy use optical interferometer 130 or an array of interferometric filters. In the case of an interferometer, such as Michelson type shown in FIG. 1, light entering the interferometer is split by beamsplitter 131, with one part of the light going to the fixed mirror 132 and the second part of the light going to movable mirror 133. When these two beams of light recombine at beamsplitter 131, they interfere and form an interferogram after imaging optics on light sensing detector 134. When detector 134 is not a single element, but rather a two-dimensional array of detectors, each detector element captures an interferogram from a specific area of the target, thus forming spectroscopic images after the signals are Fourier transformed. In this preferred optical architecture, multiple spectra corresponding to the area of interest are imaged simultaneously with each picture element or pixel having spectra associated with it, i.e. with spectral images of the area of interest formed with the single interferometer. The spectral region of interest to detect fires is primarily the infrared region, as outlined above, and, therefore, the detector arrays should be sensitive to these wavelengths. Two-dimensional detector arrays can be fabricated from semiconductor materials such as Indium Gallium Arsenide (InGaAs), Gallium Arsenide (GaAs), Lead Sulfide (PbS), Lead Selenide (PbSe) or Mercury Telluride (HgTe), etc. that detect radiation in SWIR. Also, the detector arrays can be two-dimensional bolometer arrays that respond thermally to a very wide range of wavelengths. Multiple spectral regions are selected to reduce interference from clouds and smoke.

More detailed spectroscopic images can be obtained by including a visible wavelength region captured simultaneously with infrared spectroscopic images by inserting a suitable beamsplitter into the imaging optical path and adding a two-dimensional silicon detector array. Alternatively, a separate, visible, interferometric imager can be used in addition to a single or multiple infrared spectroscopic imager.

Other interferometers such as tunable Fabry Perot, Mach Zehnder, Rikkel-Jacks, etc. can be used. The additional components that complete the imaging spectrometer include spectroscopic image storage system 160 that receives data from two-dimensional detector array 134, Fast Fourier Transform (FFT) processor 170 that converts time dependent data into a spectroscopic domain, and controller 180 that synchronizes data acquisition and transfer to cloud 183 or land based storage system 182 using transmitter 181.

Another useful architecture for fire detection relies on a filter-based imaging spectrometer with two-dimensional arrays of fixed Fabry Perot filters, each having an imaging filter pixel subdivided into a subpixel array of filters and one detector element in the detector array corresponding to each subpixel filter. These spectrometers can operate in visible and infrared wavelength regions.

The optical architecture of the filter-based imaging spectrometer is similar to the interferometric architecture in FIG. 1, except that interferometer 130 is substituted by filter and detector array system and FFT processor 170 is not needed. The filter array system is composed of imaging filter pixels with each pixel being subdivided into subpixel filter array that provides the desired spectrum corresponding to each imaging pixel. The optical signal transmitted through each filter subpixel is detected by a photosensitive detector that is a part of the detector array placed behind the filter array. Consequently, the spectroscopic images are captured without interferometric or dispersive spectrometry.

Although the simplest filter array can be composed of color filters, such filters have relatively poor spectral resolution because the filter transmission is relatively broad. Interferometric filters, such as those of Fabry Perot (FP) type, can deliver high spectral resolution based on the construction of the filters. The simplest FP filters contain a single cavity whose thickness defines the central wavelength of the transmitted light and two stacks of multilayers surrounding the cavity. The multilayers are composed of one or more sets of layers of alternating high and low refractive indices. The transmission bandwidth depends on whether there are multiple repeating structures with multiple cavities. The interferometric transmission characteristics are strongly dependent on the incident angle, and the spectral resolution can be maintained only when the incident angle range is controlled. To control the incident angle, a segmented window that contains as many window frames as there are interferometric subpixel filters and detectors is required. The window frames employed with the filter arrays must have strong light absorption capabilities to control the incident angle of light falling on the interferometric filter array in a narrow range. Further improvements of spectral resolution are obtained by processing the optical signals in the large array of detectors and filters, so that the light propagating from the illumination point to the detectors has consistent spatial patterns.

An attractive, low cost filter array can be achieved by using a Fabry Perot array of filter elements manufactured in one etching step using variable density nanometer features. Normally, fabricating large arrays of interferometric filters is challenging as the number of photolithographic and etching processing steps equals the number of unique filters required. A novel approach with different subwavelength nanometer features in each filter area can produce filter arrays using a single photolithographic and etching fabrication step.

Light transmission with wavelength λ through a cavity surrounded by a partially reflecting interfaces occurs when $$m \cdot \lambda = 2d \cdot n \cdot \sin[\theta(1+\varphi)] \quad (2)$$

where n is the refractive index of the cavity, d is the interferometric cavity gap, m is an integer, θ is the incident angle and φ is the phase change at interfaces. When the refractive index n is varied by including different densities of subwavelength features in each interferometric subpixel, a filter array with narrow band transmissions can be formed for each pixel. A single photolithographic step followed by a single etching step is required to form a large pixel array with subpixels having spectroscopic filtering capabilities.

The described interferometric filter array spectroscopic imaging systems can be very compact, low weight and inexpensive. Other spectroscopic systems such as dispersive refractive or reflective spectrometers could be also used, but they would require a separate spectrometer for each pixel, which is impractical.

Fires cause property and land damage and air pollution, and when they spread uncontrollably into inhabited areas, the loss of human life and significant property damage. The typical biomass contains elemental potassium K up to 7%, sodium Na up to 0.1%, phosphor P up to 1%, and calcium Ca up to 5%. These elements are brought to an excited state by high temperatures associated with fire and when the ionized elements return to their baseline states, light emission occurs. In particular, potassium K is relevant, as there are two transitions $2P^{3/2}$ to $2S^{1/2}$ and $2P^{1/2}$ to $2S^{1/2}$ that lead to light emission at 766.5 nm and 769.9 nm, respectively. Inexpensive, silicon-based detector sensors can readily detect radiation at these wavelengths. With a two-dimensional array of such detectors, maps of potassium K or other elements can be formed to add additional data to the above-described infrared and visible fire detection.

In order to provide real time or near real time monitoring of large areas for early fire detection, imaging spectrometers have to be placed on satellites.

In principle, two types of satellites can be used. Geostationary satellites orbit the globe maintaining a fixed position above the ground, providing continuous, real time monitoring of covered areas. They must be positioned at an altitude of 35800 km. At this altitude, a very high spatial resolution optical system is required to detect small fires, requiring very expensive mapping spectrometers. Additionally, spatial interference with many other geostationary satellites would occur, including those for commercial and military applications. This option would provide continuous, real time monitoring of selected areas. A limitation of this system is that a very large number of these geostationary satellites would be required to cover substantial area of the USA or world. More specifically, very high-resolution imaging spectrometers typically cover areas with approximate dimensions of 100 km, meaning that more than one thousand satellites would be necessary to just cover the continental USA. Expensive spectroscopic equipment together with a very large number of satellites would lead to high (potentially prohibitive) implementation costs.

Other types of satellites can orbit at the selected altitude, but their orbital times are directly linked to altitude and vice-versa. Although their imaging capability is not real time, orbital times can be selected so that the maximum cycle time between successive images is less than a selected period, such as 1 to 2 hours. With these orbiting satellites, wide swaths of territory are imaged at each orbit with each satellite, and consequently, the number of satellites required to map substantial parts of the USA or even the world becomes reasonable. For example, with short orbital times of 1.5 hours, the corresponding altitude of a low orbiting satellite would be 100 km and imaging resolution does not have to be very high, even when features down to 1 m are to be resolved.

Figure 2:
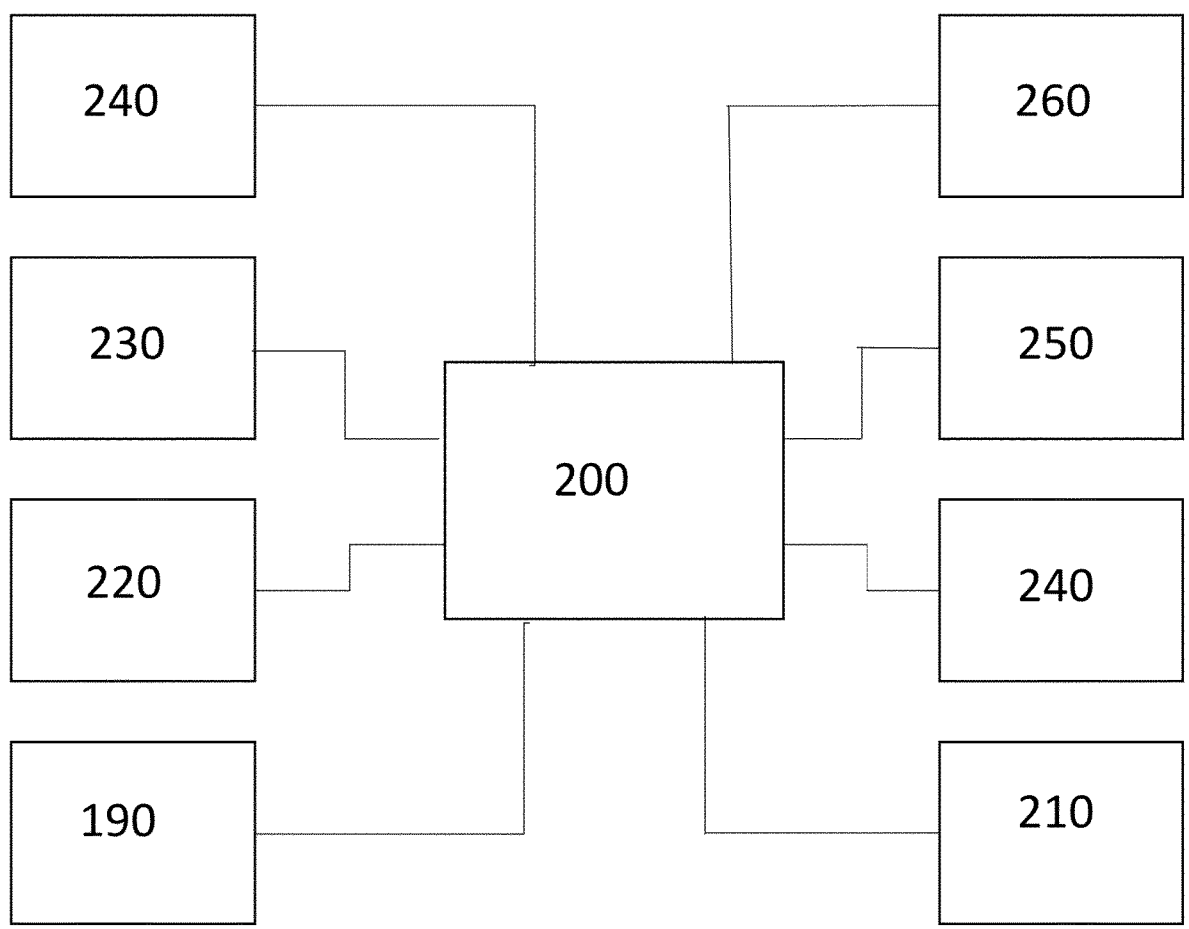
FIG. 2 shows the block diagram of typical spectroscopic imaging micro-satellite system.

These low orbiting spectroscopic imaging micro-satellites contain only a few subsystems as outlined in FIG. 2; as a result, they can be very small and inexpensive, in effect, micro-satellites 200. Apart from interferometric imaging spectrometers 190 or filter-based imaging spectrometers described above, micro-satellites 200 have high resolution, color, visible imaging camera(s) 210. In addition, Global Positioning System (GPS) 220 that synchronizes the infrared and visible spectroscopic images with the location are a part of the micro-satellite system 200. Micro-satellites must be equipped with stabilizers 230 and thrusters 240 to properly position the micro-satellites. The system's power is supplied by high efficiency solar cells and rechargeable batteries 260. System 200 is controlled with controllers and communication subsystem with high bandwidth transmitters and receivers 250 that send data to cloud 183 and central land-based monitoring centers 182. The micro-satellite system 200 has processing capabilities to provide initial image and data analysis, followed by computer systems performing AI analysis on the ground.

As a result, the entire continental USA and a corresponding band around the globe is monitored with fewer than 100 micro-satellites having spectroscopic imaging capabilities. The cost to implement such micro-satellite systems is dramatically lower than geostationary based satellites systems with comparable imaging capabilities, the only limitation being a maximum delay of 1.5 hours or less with the micro-satellites detection system. These delay times represent near real time monitoring. The cost of these systems can be further reduced when imaging spectrometers are placed on micro-satellites that are deployed for fifth generation (5G) wireless communication systems.

Figure 3:
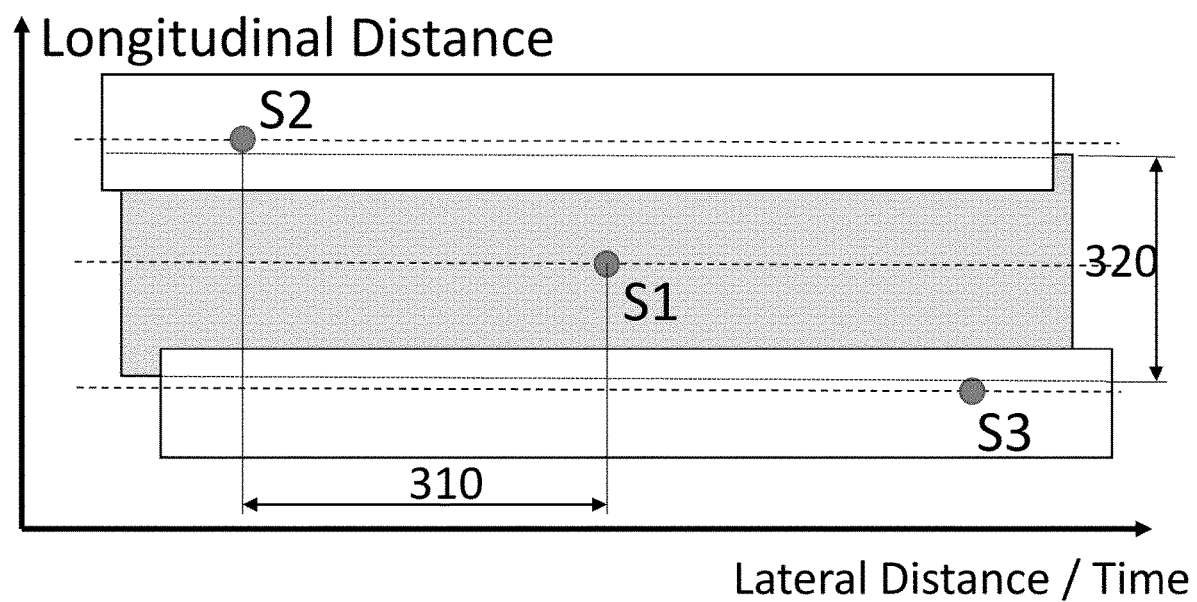
FIG. 3 shows the schematic positioning of adjacent micro-satellites with overlapping detection zones.

Multiple micro-satellites can be launched with one launching system to the desired altitude and then positioned by moving the micro-satellites sideways to different longitudes and latitudes. The micro-satellites can be positioned so that adjacent satellites are time shifted by the orbital time divided by n (e.g. n=3 in the example shown in FIG. 3) with some overlap of imaged adjacent areas, as shown schematically in FIG. 3. Micro-satellites S1, S2 and S3 have longitudinal detection zones 320 that overlap longitudinally by about one half of the detection zone width. S1, S2 and S3 are positioned in such a way that they orbit the earth with lateral time separation 310 equal to (1/n) of the orbital time, i.e. about 30 min in the above example. This effectively reduces the time between subsequent images to orbital time divided by n. Polar orbits, west to east orbits, and more complex distribution patterns can be employed to further reduce delay times. Micro-satellites thrusters are used to position them. If shorter delay times then given in this example are required, additional micro-satellites can be added.

Figure 4:
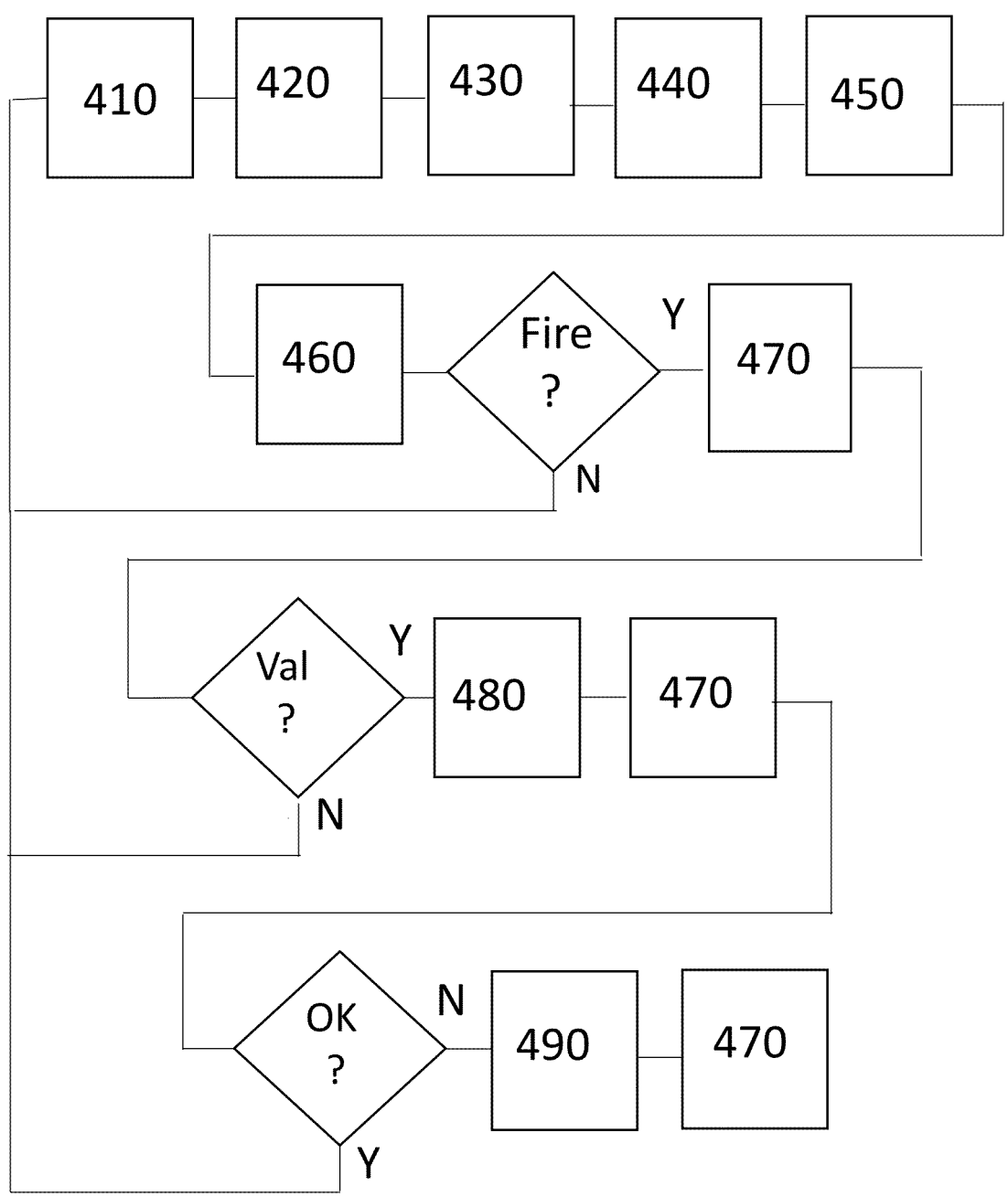
FIG. 4 is a flow chart diagram of a fire detection and suppression method.

A method of capturing and monitoring fires is outlined in the flowchart of FIG. 4.

Spectral images are captured at multiple visible and infrared wavelength regions at a selected rate to provide overlapping images. Each image is identified with GPS recorded location so that the overlapping image areas can be compared by image subtractions of spectroscopic images from prior orbit and the current orbit to further enhance the quality and resolution of the spectral imaging. The imaging rate can be set over a wide range, i.e., from about one milliHertz for non-overlapping imaging, to hundreds of Hertz, when any given area will be covered multiple times.

One micro-satellite can cover the circumferential band land mass around the globe. The spectral images are sent wirelessly to a few land-based stations or satellite-based stations in the cloud for processing. The whole cycle is repeated at the next orbit and the spectral images from the previous orbit(s) are compared with the current spectral images. The simplest comparative analysis subtracts images from the same locations. More advanced spectral images processing involves AI and deep learning techniques. The differences show changes, including potential fires that might have started since the previous orbit or images from an adjacent micro-satellite with time shift. Areas exhibiting change are examined for differentiation between fires and ordinary lighting and non-fire states.

When the spectral changes are consistent with the characteristics of a fire, local drones equipped with the spectroscopic imagers described above and visible imaging cameras are launched to evaluate whether the determination is valid in order to exclude false positives. The drones' subsystems have imaging capabilities similar to micro-satellite imaging capabilities. If the drones confirm that a fire is present, then larger drones, aircraft or helicopters are employed in an attempt to extinguish the fire. If such action is inadequate, land-based firefighters are deployed. In this system, the maximum time between the start of a fire and initial attempts to extinguish it would be about 30 min. During this period, the fire's potential reach is limited and stopping it would not require excessive resources. If shorter response times are required, the number of micro-satellites would have to be increased.

As stated above, the number of micro-satellites necessary to cover the USA and even the whole world with complete imaging is reasonable. High-resolution spectral images in visible and infrared wavelengths regions are taken and compared with previously taken reference images of the same areas when no fires were present as determined by ordinary image subtraction, combined with AI analysis. Spectroscopic data are used to distinguish between normal lighting and light emitted from fires. Although some false positives may arise, no false negatives should occur given the imaging resolution and sensitivity of this detection system. To minimize the effect of false positives, drones distributed over the country are deployed to ascertain whether the fire alarm is legitimate. If it is, helicopters and/or planes with water buckets or fire retardants are sent without delay to the site of the starting fire.

As shown in the flowchart in FIG. 4, the method for fire detection is as follows:

1. Recording, 410 of spectroscopic images in multiple visible and infrared wavelength regions continuously from multiple spectral acquisitions in every orbital pass from each micro-satellite.

2. Splitting spectral video into individual frames and extracting data, 420. Although data can be captured at high rates, such as 60 frames per second or faster, only one frame at lower rates is extracted since there are virtually no differences between adjacent frames. The extraction can be achieved by the summation of time shifted images corresponding to the same areas for a higher signal/noise ratio.

3. Synchronizing images, 430, using GPS and stitching of images to obtain continuous spectral maps without gaps or shifts.

4. Applying image subtractions and advanced AI image analysis, 440, to current spectroscopic images and images from previous orbits. Selecting frames of interest and automated identification of the fire/smoke area from spectroscopic image differences.

5. Stepping through each pixel in each image, comparing it with the unique signatures of smoke/fire, and calculating the probability that the pixel represents smoke/fire, 450. Comparing these probabilities with probabilities in adjacent pixels and comparing images and probabilities with images acquired in the previous orbit and in the orbits during the prior 24-hour period.

6. Mapping the probabilities of fire, 460, from these multiple sets of data from the same locations based on temperature consistency and the concentrations of the emitting elements. Combining these images to determine probability across multiple wavelength regions. Appling thresholding in temperatures and element concentrations to the images to isolate fires.

7. If an apparent fire is detected by micro-satellites, sending local imaging drones 470 with spectroscopic and visible imagers to the location to verify whether a real fire exists or not.

9. If a fire detected by micro-satellites is validated by spectroscopic drones, sending larger drones, aircraft and/or helicopters equipped with fire extinguishing capabilities 480 and monitoring the fire suppression efforts by spectroscopic imaging drones 470.

10. Sending other land-based firefighting resources, 490, if the fire has not been extinguished by aerial attacks in an hour or less.

11. Monitoring the progress of fire suppression with spectroscopic imaging drones 470.

Specific examples with varying distances, times, spectral ranges and number of spectroscopic systems and micro-satellites are included only for illustration purposes and other selections can be also effectively deployed.

A system comprised of micro-satellites orbiting at low altitudes with spectroscopic imagers and local drones equipped with spectroscopic imagers provides the means for early fire detection and containment.

What is claimed:

1. A system for detection and suppression of fires, the system comprising:
  a network of low orbiting micro-satellites configured to operate at orbital times between one to two hours;
  interferometer-based imaging spectrometers mounted on the low orbiting micro-satellites and configured to capture spectral images at multiple visible and infrared wavelength regions;
  a processor configured to apply image subtraction and artificial intelligence to perform image analysis of the captured spectral images to identify fires and differentiate between fires and other light sources;
  drones equipped with visible and infrared spectroscopic imagers configured to verify validity of the identified fires;
  a communication network configured to send data between the low orbiting micro-satellites, cloud, ground stations, drones and firefighting resources; and
  drones, helicopters, planes and/or ground firefighting equipment configured to deliver fire retardants and/or water to extinguish the identified fires.

2. The system of claim 1, wherein each of the low orbiting micro-satellites further comprises:
  a visible imaging camera;
  a global positioning system;
  stabilizers and thrusters;
  solar cells and batteries;
  transmitters and receivers; and
  processors and controllers.

3. The system of claim 1, wherein the interferometer-based imaging spectrometers comprise tunable Fabry Perot filter, Michelson or Mach Zehnder interferometers with two-dimensional silicon detector array.

4. The system of claim 1, wherein the interferometer-based imaging spectrometers comprise tunable Fabry Perot filter, Michelson or Mach Zehnder interferometers with two-dimensional bolometer detector array.

5. The system of claim 1, wherein the interferometer-based imaging spectrometers comprise tunable Fabry Perot filter, Michelson interferometer or Mach Zehnder interferometers with two-dimensional Indium Gallium Arsenide (InGaAs), Gallium Arsenide (GaAs), Lead Sulfide (PbS), Lead Selenide (Pb Se) or Mercury Telluride (HgTe) detector array.

6. The system of claim 1, wherein adjacent micro-satellites are positioned laterally and longitudinally to reduce delay times between subsequent imaging to fraction of orbital times.

7. A system for detection and suppression of fires, the system comprising:
  a network of low orbiting micro-satellites configured to operate at orbital times between one to two hours;
  filter-based imaging spectrometers mounted on the low orbiting micro-satellites and configured to capture spectral images at multiple visible and infrared wavelength regions, wherein filter arrays have each filter pixel subdivided into a subpixel array of interferometric filters and one detector element in a detector array corresponding to each subpixel filter element;
  a processor configured to apply image subtraction and artificial intelligence to perform image analysis of the captured spectral images to identify fires and differentiate between fires and other light sources;

drones equipped with visible and infrared spectroscopic imagers configured to verify validity of the identified fires;

a communication network configured to send data between micro-satellites, cloud, ground stations, drones and firefighting resources; and drones, helicopters, planes and/or ground firefighting equipment configured to deliver fire retardants and/or water to extinguish the identified fires.

8. The system of claim 7, wherein each of the low orbiting micro-satellites further comprises:
a visible image camera;
a global positioning system;
stabilizers and thrusters;
solar cells and batteries;
transmitters and receivers; and
processors and controllers.

9. The system of claim 7, wherein the filter-based imaging spectrometers comprise subpixel array of interferometric filters formed with different density of subwavelength features in each subpixel.

10. The system of claim 7, wherein the filter-based imaging spectrometers are configured with two-dimensional silicon detector array.

11. The system of claim 7, wherein the filter-based imaging spectrometers are configured with two-dimensional bolometer detector array.

12. The system of claim 7, wherein the filter-based imaging spectrometers are configured with two-dimensional InGaAs, GaAs, PbS, PbSe or HgTe detector array.

13. The system of claim 7, wherein adjacent micro-satellites are positioned laterally and longitudinally to reduce delay times between subsequent imaging to fraction of orbital times.

14. A method of detection and suppression of fires, the method comprising:

providing a network of low orbiting micro-satellites having orbital times between one to two hours and equipped with interferometer-based or filter-based infrared and visible imaging spectrometers, processors, controllers, global positioning system, solar cells, batteries, and communication equipment;

providing drones equipped with interferometer-based or filter-based infrared and visible imaging spectrometers;

capturing multiple spectral images with the imaging spectrometers of the low orbiting micro-satellites;

analyzing the captured multiple spectral images using image subtraction and artificial intelligence to identify fires and differentiate fires from other light sources;

activating drones to verify the validity of the identified fires;

launching fire suppression with drones, helicopters, planes and/or ground firefighting equipment configured to deliver fire retardants and/or water to extinguish the identified fires.

* * * * *